United States Patent
Horgan et al.

(10) Patent No.: US 11,308,499 B2
(45) Date of Patent: Apr. 19, 2022

(54) FRAUD DETECTION IN SELF-SERVICE TERMINAL

(71) Applicant: NCR Corporation, Atlanta, GA (US)

(72) Inventors: Kevin Horgan, Dundee (GB); Gordon D. Chisholm, Perth (GB); Campbell Benn, Dundee (GB)

(73) Assignee: NCR Corporation, Atlanta, GA (US)

( * ) Notice: Subject to any disclaimer, the term of this patent is extended or adjusted under 35 U.S.C. 154(b) by 138 days.

(21) Appl. No.: 16/705,383

(22) Filed: Dec. 6, 2019

(65) Prior Publication Data
US 2020/0111101 A1 Apr. 9, 2020

Related U.S. Application Data

(62) Division of application No. 14/231,011, filed on Mar. 31, 2014, now Pat. No. 10,515,367.

(51) Int. Cl.
*G06Q 20/40* (2012.01)
*G07F 19/00* (2006.01)
*G06Q 20/10* (2012.01)

(52) U.S. Cl.
CPC ..... *G06Q 20/4016* (2013.01); *G06Q 20/1085* (2013.01); *G07F 19/203* (2013.01); *G07F 19/207* (2013.01)

(58) Field of Classification Search
USPC ..................................................... 705/35–45
See application file for complete search history.

(56) References Cited

U.S. PATENT DOCUMENTS

| | | | | |
|---|---|---|---|---|
| 4,514,623 A | * | 4/1985 | Baus | G06K 7/084 235/449 |
| 5,010,238 A | * | 4/1991 | Kadono | G06Q 40/02 235/379 |
| 5,945,602 A | * | 8/1999 | Ross | G07D 11/237 73/570 |
| 6,390,067 B1 | * | 5/2002 | Haltiner, Jr | F02M 51/0667 123/470 |
| 6,390,367 B1 | * | 5/2002 | Doig | G07F 19/20 235/379 |
| 6,400,276 B1 | * | 6/2002 | Clark | G07F 19/20 340/541 |
| 6,583,864 B1 | * | 6/2003 | Stanners | G07F 19/207 356/71 |
| 7,093,750 B1 | * | 8/2006 | Block | G07F 19/20 235/379 |

(Continued)

FOREIGN PATENT DOCUMENTS

GB  2351590 A  3/2001

OTHER PUBLICATIONS

B. Reardon, K. Nance and S. McCombie, "Visualization of ATM Usage Patterns to Detect Counterfeit Cards Usage," 2012 45th Hawaii International Conference on System Sciences, 2012, pp. 3081-3088 (Year: 2012).*

*Primary Examiner* — Mohammad Z Shaikh
(74) *Attorney, Agent, or Firm* — Schwegman, Lundberg & Woessner

(57) ABSTRACT

A method includes monitoring patterns of commands provided by a self-service terminal controller, identifying potential fraud in the monitored patterns of commands, and suspending operation of a dispenser of the self-service terminal responsive to the identification of potential fraud.

5 Claims, 2 Drawing Sheets

(56) References Cited

U.S. PATENT DOCUMENTS

| | | | |
|---|---|---|---|
| 7,118,031 B2* | 10/2006 | Ramachandran | G06Q 20/18 235/379 |
| 7,151,451 B2* | 12/2006 | Meskens | G06K 13/067 340/552 |
| 7,194,414 B1* | 3/2007 | Savage | G06Q 20/382 705/64 |
| 7,240,827 B2 | 7/2007 | Ramachandran | |
| 7,469,825 B2* | 12/2008 | Clark | G07F 19/20 235/383 |
| 7,575,166 B2* | 8/2009 | McNamara | G06Q 20/18 235/379 |
| 7,583,290 B2* | 9/2009 | Enright | G06Q 20/18 348/143 |
| 7,798,395 B2 | 9/2010 | Ramachandran | |
| 7,856,401 B2* | 12/2010 | Ross | G07F 19/20 705/42 |
| 7,971,779 B2* | 7/2011 | Jenkins | G06Q 20/18 235/379 |
| 7,995,791 B2* | 8/2011 | Flook | G07F 19/207 382/100 |
| 8,057,737 B2* | 11/2011 | Deura | C21C 7/0087 420/111 |
| 8,225,993 B2 | 7/2012 | Jenkins | |
| 8,255,993 B2* | 8/2012 | Cooley | G06F 21/56 726/22 |
| 8,395,500 B1* | 3/2013 | Dent | G08B 13/1609 340/540 |
| 8,397,991 B2* | 3/2013 | Mueller | G06Q 20/341 235/450 |
| 8,549,212 B2* | 10/2013 | Lu | G06F 12/0246 711/103 |
| 8,556,166 B1 | 10/2013 | Lewis | |
| 8,556,168 B1* | 10/2013 | Lewis | G07F 19/20 235/379 |
| 8,640,947 B1* | 2/2014 | Lewis | G07F 19/2055 235/379 |
| 8,944,317 B2* | 2/2015 | Lewis | G07F 19/2055 235/379 |
| 8,985,298 B2* | 3/2015 | Crist | G07D 11/225 194/206 |
| 8,998,186 B2* | 4/2015 | Kim | F16F 13/10 267/140.13 |
| 9,014,845 B2* | 4/2015 | Babu | G07F 19/207 700/225 |
| 9,163,978 B2* | 10/2015 | Crist | G07D 13/00 |
| 9,183,468 B2 | 11/2015 | Neubauer | |
| 9,342,963 B1 | 5/2016 | Mcgraw, IV | |
| 9,368,002 B2 | 6/2016 | Crist | |
| 9,401,062 B2 | 7/2016 | Koide | |
| 9,663,035 B2* | 5/2017 | Nakata | G06T 11/60 |
| 9,666,035 B2* | 5/2017 | Blower | G07D 11/14 |
| 9,767,422 B2* | 9/2017 | Ray | G07F 19/2055 |
| 10,332,205 B1* | 6/2019 | Russell | G06Q 40/04 |
| 10,515,367 B2* | 12/2019 | Horgan | G06Q 20/4016 |
| 2002/0038167 A1 | 3/2002 | Chirnomas | |
| 2003/0024790 A1 | 2/2003 | Quattrini | |
| 2003/0080138 A1 | 5/2003 | Chirnomas | |
| 2003/0120597 A1* | 6/2003 | Drummond | G06Q 20/18 705/43 |
| 2004/0149819 A1 | 8/2004 | Shepley | |
| 2004/0178258 A1* | 9/2004 | Scarafile | G07F 19/21 235/379 |
| 2004/0200894 A1* | 10/2004 | Ramachandran | G07F 19/207 235/379 |
| 2005/0269345 A1* | 12/2005 | Sommerville | G07F 19/20 221/162 |
| 2006/0169764 A1* | 8/2006 | Ross | G07F 19/207 235/375 |
| 2006/0273151 A1* | 12/2006 | Block | G07F 19/209 235/379 |
| 2007/0203826 A1 | 8/2007 | Russell | |
| 2008/0054063 A1* | 3/2008 | MacPhail | G06Q 20/1085 235/379 |
| 2008/0136657 A1* | 6/2008 | Clark | G07F 19/20 340/686.6 |
| 2008/0288382 A1 | 11/2008 | Smith | |
| 2009/0057395 A1 | 3/2009 | He | |
| 2009/0199053 A1* | 8/2009 | Neilan | G07F 19/207 714/57 |
| 2010/0228580 A1 | 9/2010 | Zoldi | |
| 2011/0016052 A1 | 1/2011 | Scragg | |
| 2011/0035797 A1* | 2/2011 | Slowik | G03G 15/502 726/17 |
| 2011/0270752 A1 | 11/2011 | Neto | |
| 2012/0038775 A1 | 2/2012 | Priesterjahn | |
| 2012/0226613 A1 | 9/2012 | Adjaoute | |
| 2013/0311371 A1 | 11/2013 | Zhu | |
| 2014/0151450 A1* | 6/2014 | Lewis | G07F 19/2055 235/379 |
| 2014/0201077 A1 | 7/2014 | Cama | |
| 2008/0915540 | 8/2014 | Gee | |
| 2014/0232863 A1 | 8/2014 | Paliga | |
| 2014/0324677 A1* | 10/2014 | Walraven | G06Q 20/4016 705/39 |
| 2014/0337212 A1 | 11/2014 | Crist | |
| 2014/0372305 A1 | 12/2014 | Ray | |
| 2015/0068863 A1* | 3/2015 | Blower | G07F 1/044 194/202 |
| 2015/0278818 A1* | 10/2015 | Horgan | G07F 19/203 705/43 |
| 2016/0140563 A1* | 5/2016 | Crist | G06Q 20/1085 705/43 |

* cited by examiner

FRAUD DETECTION IN SELF-SERVICE TERMINAL

BACKGROUND

Increasingly consumers are conducting financial transactions through Self-Service Terminals (SSTs) without the assistance of a clerk. In fact, in many cases these transactions are conducted without any individual in the vicinity of the SSTs; other than, perhaps, a security camera integrated into the SSTs or in proximity to the SSTs.

The most common SST transaction occurs by a customer at an Automated Teller Machine (ATM). Contrary to what the general public believes, ATMs can be compromised and in some ways in a manner that takes advantage of inherent security holes of existing ATMs.

For example, in a typical ATM transaction a customer inserts a bank card into a card reader and then enters a Personal Identification Number (PIN) into an encrypted PIN keypad. Software on the ATM receives that encrypted information, which the ATM software cannot decrypt and sends it to an appropriate backend financial system for authentication. The financial sends returns an authorization code to the ATM software and the customer selects and account and an amount to withdraw. This is then sent to the financial system for verification. Again, the financial system returns an authentication. Next, the ATM sends a dispense command to a dispenser and the dispenser dispenses the currency amount associated with the withdrawal.

In the above scenario, if the ATM software can be replaced or modified then the amount for withdraw sent to the dispenser can be changed or can be repeated multiple times; thereby fraudulently depleting the ATM of all its currency. Such fraudulent depleting is of particular concern to the owners and operators of the ATMs because the financial system tied to a transaction may only honor the initial authorized amount for withdrawal, leaving the ATM owner and operator with no recourse to recoup the stolen funds.

SUMMARY

In various embodiments, dispense transactions are suspended on a self-service terminal upon detection of potentially fraudulent activity.

According to an embodiment, commands performed on the self-service terminal are monitored to detect fraudulent activity. If a pattern of commands appears to be potentially fraudulent, a dispenser may be placed in a suspend mode.

DETAILED DESCRIPTION

Figure 1:
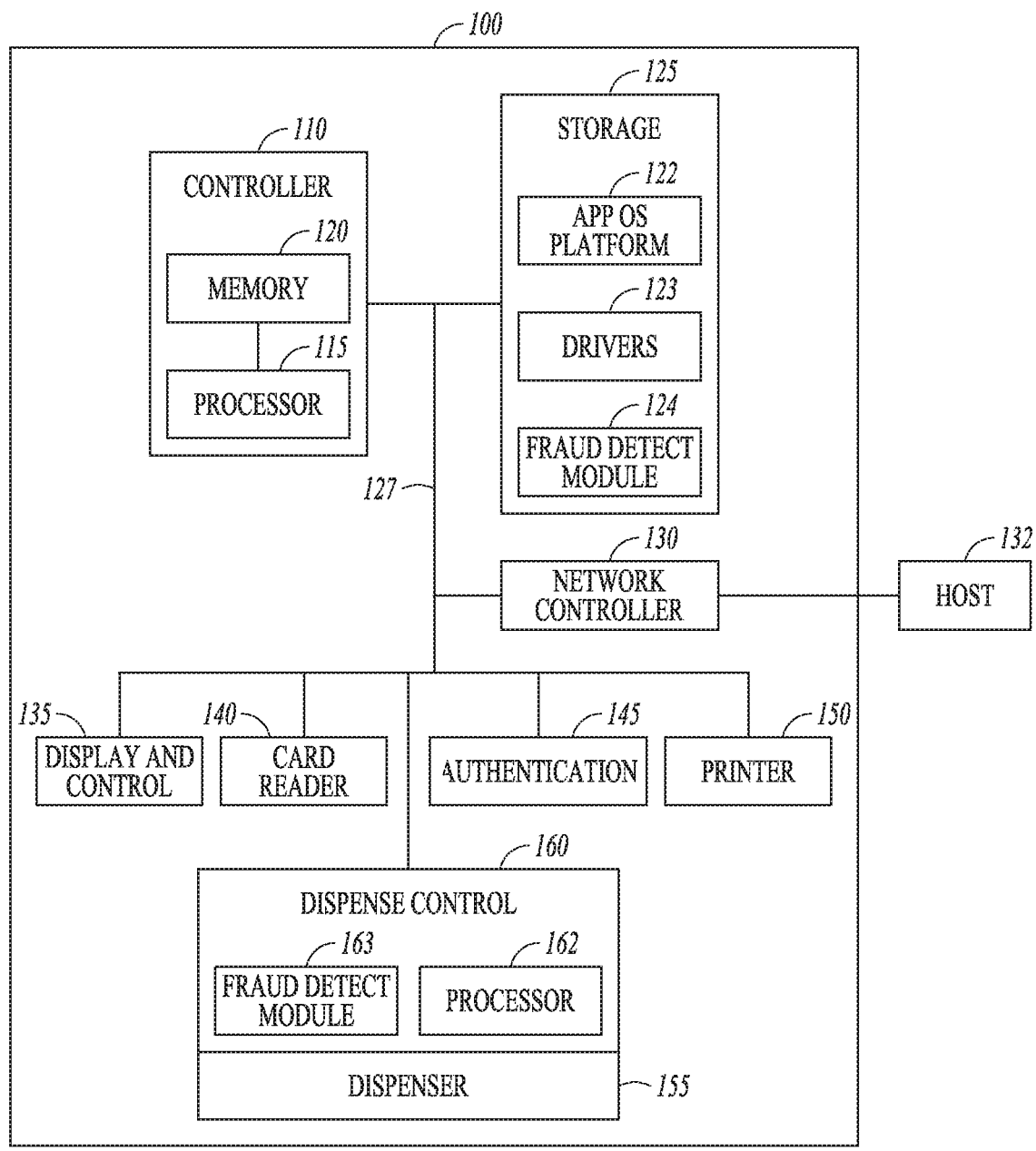
FIG. 1 is a block diagram of a self-service terminal (SST) having dispense suspend control according to an example embodiment.

FIG. 1 is a block diagram of a self-service terminal architecture to detect potential fraudulent patterns of commands and suspend dispense operations. In one embodiment, the self-service terminal is an automated teller machine (ATM) 100 that dispenses value in the form of cash, coupons, and other items of value referred to as dispense media. The various components are illustrated and the arrangement of the components is presented for purposes of illustration only. It is to be noted that other arrangements with more or less components are possible without departing from the onsite automated customer assistance teachings presented herein and below.

The ATM, techniques, methods, and Self-Service Terminal (SST) presented herein and below for detecting fraudulent command patterns and suspending dispense operation can be implemented in whole or in part in one, all, or some combination of the components shown with ATM 100. The techniques and methods are programmed as executable instructions in memory and/or non-transitory computer-readable storage media and processed on one or more processors associated with the various components.

The discussion of the ATM 100 is within the context of multiple transactions and is also applicable to any enterprise providing Self-Service Terminals (SSTs). Thus, the description that follows below is but one embodiment of the invention and it not intended to limit the invention to only financial transactions on the ATM 100.

ATM 100 includes a controller 110 that in one embodiment includes a processor 115 and memory 120 for executing commands while processing transactions. Programming for the controller 110 is stored in storage device 125 which is coupled via a connector 127 to the controller 110 and provides operating system code, an operating platform, and various applications to the memory 120 for execution by processor 115. A network controller 130 is also coupled via connector 127 to communicate with a remote server 132 or for checking account balances and otherwise supporting operation of ATM 100.

Connector 127 may be a backbone type of connector such as a system bus to connect multiple components of ATM 100, including a display and display controller represented at 135, a card reader 140, an authentication module 145 such as an encrypting keypad for entry of personal identification numbers (PIN), sometimes referred to as a PINpad 145, and a printer 150 to print receipts and balance information. Each of these components execute commands from the processor resulting from customer transactions.

Controller 110 is also coupled to a dispenser 155 that processes commands to dispense media as part of performing transactions, and implementing diagnostic functions. The dispenser 155 in one embodiment includes a dispense control module 160 which may utilize circuitry such as firmware and a secure microprocessor such as indicated at 162.

The ATM 100 is presented in greatly simplified form and is used to illustrate portions of components modified for purposes of monitoring commands and suspending dispense operations when a fraudulent pattern of commands is detected.

The memory 120 includes an ATM application 122 providing an application programming interface (API) for interacting with the dispenser 155 and the remote host 132. The ATM application 122 also includes a forward-facing Graphical User Interface (GUI and not shown in the FIG. 1) for interaction with a customer to perform a financial transaction with an external financial system coupled to remote host 132. The ATM application 122 also includes a service GUI (not shown) to allow an authorized person to perform servicing and diagnostic functions on the ATM 100.

The memory 120 also includes device drivers 123 for providing low-level commands for controlling various ATM devices (including the card reader 140, the encrypting PINpad 145, the printer 150, and the dispenser 155. The device drivers 123 include a fraud detection module 124 that detects events generated by devices within the ATM 100 and commands issued to devices within the ATM 100. As will be described in more detail below, the fraud detection module 124 operates to detect patterns of device operation and to identify any patterns that may indicate fraudulent operation of the ATM 100 or any of the devices therein.

The dispenser 155 is coupled to or integrated within the ATM 100 and can perform dispense functions responsive to requests. The coupling can be via a Universal Serial Bus (USB) port interface or other port interface, again represented by connector 127. The dispenser 155 includes a conventional dispensing mechanism (not shown) for dispensing currency to a customer. The dispensing mechanism is capable of counting the currency from available denominations and activating a door for dispensing the counted currency. The dispenser 155 may only be accessible for interaction through the ATM application 122 in memory 120 as executed on processor 115.

The dispenser secure microprocessor 162 in one embodiment is not accessible to any of the API calls made by the ATM application 122. The secure microprocessor 162 may house cryptographic keys, certificates, and one or more cryptographic algorithms (functions). In some cases, the secure microprocessor 162 is pre-manufactured with the keys, certificates, and functions. In other cases, the keys, certificates, and functions can be installed on the secure microprocessor 162 by removing the dispenser 155 from the ATM 100 and interfacing the dispenser 155 to an independent secure device for installation and initial configuration.

The dispenser 155 also includes a dispenser fraud detection module 163 that is operable to monitor dispense commands and to detect any pattern of dispense commands that may be indicative of fraud, as will be described in more detail below.

The interaction of the components is now discussed with an example configuration and operational scenario. It is noted that other scenarios are possible without departing from the beneficial teachings provided herein.

In one typical example ATM transaction, a customer approaches the ATM 100 to withdraw some cash (currency or money). The GUI portion of the ATM application 122 typically presents an attract screen until such time as a customer inserts his/her card into the card reader 140. The customer's card is then read and the ATM controller 122 presents a sequence of screens to collate transaction information from the customer. The ATM controller 122 also issues commands to various devices as part of the information collation. For example, the ATM controller 122 enables the encrypting PINpad 145 when a PIN entry screen is presented to the customer.

In a typical ATM transaction at the ATM 100, a customer will insert his/her card, enter his/her PIN, then request a transaction type and amount. The requested transaction will then be authorized by the remote host 132. If authorized, a dispense command will be issued by the ATM controller 122 to the dispenser 155. However, if the fraud detection module 124 does not detect any events relating to the card reader 140 and/or the encrypting PINpad 145, then the fraud detection module 124 will indicate that this is a potentially fraudulent transaction. It should be appreciated that various events (or the absence thereof) from different devices may be used as indicators of potential fraudulent activity.

In addition to fraud detection via the fraud detection module 124 performed for example by the controller 110 of the ATM 100, the dispenser 155 may also detect potentially fraudulent patterns. Dispenser fraud detection module 163 may recognize a pattern of continual dispensing and identify that as potentially fraudulent. For example, if dispense commands are received within a defined time period that is deemed not sufficient for a transaction to be authorized (the minimum transaction time) then this may be indicative of fraud.

In some embodiments one set of commands may relate to transaction dispenses, whereas, a different set of commands may relate to diagnostic dispenses of the type that an authorized person would use when testing the dispenser 155 during servicing or repair of the dispenser 155. In such embodiments, if the dispense commands relate to diagnostic tests from an authorized person, then the fraud detection module 124 may not take any action even if the time period between dispense commands is shorter than the defined minimum transaction time. However, if the dispense commands relate to customer transaction commands, then the fraud detection module 124 may put the dispenser 155 into a suspend mode in which no further transactions are performed. A suspend mode may be any type of mode or state that the dispenser 155 may be placed in to prevent execution of dispense commands.

Figure 2:
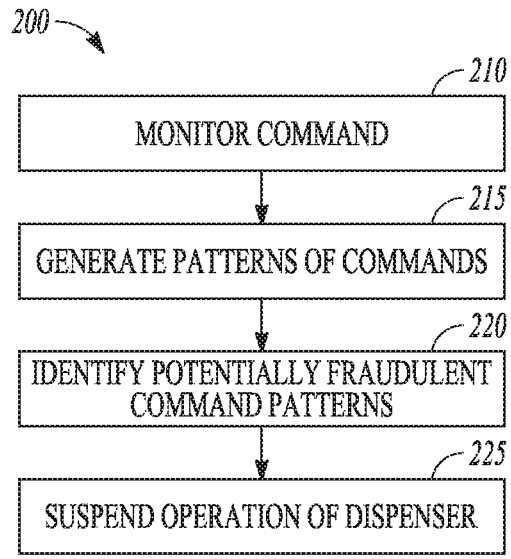
FIG. 2 is a flowchart illustrating a method for detecting potentially fraudulent command patterns and suspending a dispenser according to an example embodiment.

FIG. 2 is a flowchart illustrating a method 200 implemented by either fraud detection modules 124 or 163. Method 200 may be implemented in firmware, hardware, software running on processor 115 or 162, or a combination thereof. Performing method 200 in dispenser 155 via fraud detection module 163 insulates the method from being affected by malware which might be introduced by hacking into the controller 110 or replacing storage 125 with a different storage device, such as a disk drive programmed with malware designed to issue dispense commands to fraudulently obtain money from the ATM 100.

In one embodiment, the fraud detection module 124 monitors a software stack at 210 and uses commands provided from the stack to generate patterns of commands at 215 that are being processed by the ATM 100. In the case of fraud detection module 163, the monitored commands may be dispense commands received. The patterns of commands may include several different types of patterns that have been associated or may be associated with attempts to jackpot the ATM 100. Examples include but are not limited to deviations from typical sets of commands associated with normal withdrawals, such as many dispense commands associated with a single authentication, a high number of dispense commands in consecutive transactions at a frequency approaching ATM capabilities, multiple dispense commands of the same amount, multiple transactions not usually performed by a given customer, and more. As seen from the above examples, the term "pattern" is used to identify both a sequential set of commands as well as a filtered set of commands, and even a statistical analysis of commands, such as the frequency of a dispense command, and including the frequency and relationship of other commands, such as the frequency of the dispense command compared to authentication commands.

At 220, the patterns may be analyzed to identify potentially fraudulent command patterns. The analysis may be based on thresholds or a combination of thresholds and comparison to known patterns. At 225 the method suspends operation of the dispenser 155 responsive to the identification of potential fraud.

In various embodiments, patterns of potential fraud include a number of dispense commands within an identified time period, a number of consecutive dispense commands associated with a same account number, a pattern of continual dispense commands without corresponding cardholder authentication commands.

Figure 3:
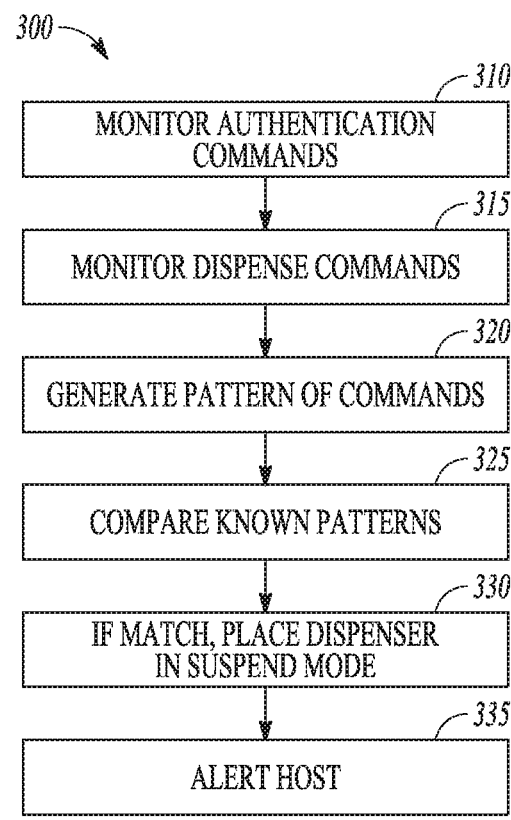
FIG. 3 is flowchart illustrating a more detailed method for detecting potentially fraudulent command patterns and suspending a dispenser according to an example embodiment.

FIG. 3 is a flowchart illustrating a more detailed method 300 according to an example embodiment. At 310, authentication commands on a self-service terminal are monitored. The authentication commands may be monitored by the controller 110 or the PIN pad 145 for example. At 315, dispense commands on a self-service terminal are monitored. The dispense commands may be monitored at least at controller 110 or dispenser 155. A pattern of the monitored authentication and dispense commands is generated at 320. As indicated above, the pattern may include many different types of patterns, including a statistical representation of commands over an identified period of time. The generated pattern is compared at 325 to known patterns corresponding to potential fraud. If the generated pattern matches such a known pattern, the dispenser is placed in a suspend mode at 330 to prevent dispensing of further media. At 335, the host may be alerted to the dispenser 155 being placed in suspend mode. A service call or other method may be used to remove the dispenser 155 from suspend mode, after checking the ATM 100 for malware.

In one embodiment, a pattern of potential fraud comprises a number of dispense commands within an identified time period. This type of pattern may be detected via fraud detection module 163 in dispenser 155, and/or alternatively in fraud detection module 124. The number of dispense commands comprises n in one embodiment, and the identified time period is n times an average transaction time, wherein n is greater than or equal to 4. Each different type of ATM may have a different average time per transaction. In one example, if an average transaction time is thirty seconds, a pattern of four dispense commands in two minutes or less may be suspicious, and constitute a suspicious pattern. An ATM having a different average transaction time may utilize a different time period for identifying suspicious patterns.

In a further embodiment, a pattern of potential fraud comprises a number of consecutive dispense commands associated with a same account number, or a pattern of multiple dispense commands without corresponding cardholder authentication commands. This type of fraud detection may be detected by fraud detection module 124, or optionally fraud detection module 163 if the dispenser 155 is adapted to monitor multiple types of commands from controller 110.

In some embodiments, a pattern of potential fraud is location dependent, or based on a pattern of commands deviating from a specific customer's commonly performed transactions. Many other suspicious patterns may be identified and included over time as fraud perpetration attempts change and become more creative.

In a further embodiment a self-service terminal (SST), comprises a controller, a token reader coupled to the controller and operable to receive identification information from a customer, and a dispenser coupled to the controller and operable to dispense media to the customer. The SST includes a fraud module operable to monitor events associated with the token reader and the dispenser and identify potential fraud when the monitored events fulfil a potential fraud criterion. The token reader may for instance provide plain text information such as encrypted PIN pad outputs.

The token reader may be a card reader, near field communication (NFC) device, Bluetooth® device, biometric sensor or other device to authenticate a customer. The fraud module may be provided in the dispenser or elsewhere in the SST, and may be formed of hardware, firmware, software, hardware, application code, or any combination thereof. In one embodiment, the monitored commands may include notifications of events generated by different components of modules of the SST, such as card insert events and dispense events.

The fraud module may be further operable to place the dispenser in a suspend mode when potential fraud is identified, or send an alert to the controller to place the dispenser in a suspend mode when potential fraud is identified.

The potential fraud criterion may comprise: the events not occurring in a pre-defined sequence; more than a defined maximum number of events including information relating to the same customer (optionally within a defined time period); successive dispense operations being performed in less than a minimum transaction time;

EXAMPLES

1. A method comprising:
monitoring patterns of commands provided by a self-service terminal controller;
identifying potential fraud in the monitored patterns of commands; and
suspending operation of a dispenser of the self-service terminal responsive to the identification of potential fraud.

2. The method of example 1, wherein the method is performed by firmware in the dispenser of the self-service terminal.

3. The method of any of examples 1-2 wherein one pattern of potential fraud comprises a number of dispense commands within an identified time period.

4. The method of any of examples 1-3 wherein one pattern of potential fraud comprises a number of consecutive dispense commands associated with a same account number.

5. The method of any of examples 1-4, wherein one pattern of potential fraud comprises a pattern of continual dispense commands without corresponding cardholder authentication commands.

6. The method of any of examples 1-5, wherein suspending operation of the dispenser comprises placing the dispenser in a suspend mode.

7. The method of any of examples 1-6, wherein the method is performed by firmware in the dispenser of the self-service terminal comprising an automated teller machine.

8. A method comprising:
monitoring authentication commands on a self-service terminal;
monitoring dispense commands on a self-service terminal;
generating a pattern of the monitored authentication and dispense commands;
comparing the generated pattern to known patterns corresponding to potential fraud; and
placing a dispenser in a suspend mode when the generated pattern matches a known pattern corresponding to potential fraud.

9. The method of example 8 wherein one pattern of potential fraud comprises a number of dispense commands within an identified time period.

10. The method of example 9 wherein the number of dispense commands comprises n, and the identified time period is n times an average transaction time, wherein n is greater than or equal to 4.

11. The method of any of examples 8-10 wherein one pattern of potential fraud comprises a number of consecutive dispense commands associated with a same account number.

12. The method of any of examples 8-11 wherein one pattern of potential fraud comprises a pattern of multiple dispense commands without corresponding cardholder authentication commands.

13. The method of any of examples 8-12 wherein one pattern of potential fraud is location dependent.

14. The method of any of examples 8-13 wherein one pattern of potential fraud is based on a pattern of commands corresponding to a specific customer's commonly performed transactions.

15. The method of any of examples 8-14, wherein the method is performed by firmware in the dispenser of the self-service terminal comprising an automated teller machine.

16. A Self-Service Terminal (SST), comprising:
a controller to execute SST commands;
a data entry pad to receive customer authentication information from the customer; and
a dispenser to dispense media, the dispenser further comprising processing circuitry to:
monitor authentication commands executing on the controller;
monitor dispense commands from the controller;
generate a pattern of the monitored authentication and dispense commands;
compare the generated pattern to known patterns corresponding to potential fraud; and
place the dispenser in a suspend mode when the generated pattern matches a known pattern corresponding to potential fraud.

17. The SST of example 16 wherein one pattern of potential fraud comprises a number of dispense commands within an identified time period.

18. The SST of any of examples 16-17 wherein the number of dispense commands comprises n, and the identified time period is n times an average transaction time, wherein n is greater than or equal to 4.

19. The SST of any of examples 16-18 wherein one pattern of potential fraud comprises a number of consecutive dispense commands associated with a same account number.

20. The SST of any of examples 16-19 wherein one pattern of potential fraud comprises a pattern of multiple dispense commands without corresponding cardholder authentication commands.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A Self-Service Terminal (SST), comprising:
a controller comprising at least one processor and a memory, the processor executes authentication commands and issues dispense commands associated with requested transactions being processed, wherein the controller is coupled to a dispenser and a data entry pad;
the data entry pad to receive authentication information from a customer, wherein the authentication information is processed by the controller with the authentication commands; and
the dispenser comprises the at least one processor to dispense media, wherein the at least one processor that is configured to:
monitor the authentication commands executing on the controller;
monitor the dispense commands issued from the controller;
generate a pattern of the monitored authentication and dispense commands against each requested transaction;
compare the generated pattern to known patterns corresponding to potential fraud; and
place the dispenser in a suspend mode when the generated pattern matches a known pattern corresponding to the potential fraud.

2. The SST of claim 1 wherein one pattern of the potential fraud comprises a number of the dispense commands within an identified time period.

3. The SST of claim 1 wherein the number of the dispense commands comprises n, and the identified time period is n times an average transaction time, wherein n is greater than or equal to 4.

4. The SST of claim 1 wherein one pattern of the potential fraud comprises a number of consecutive dispense commands associated with a same account number.

5. The SST of claim 1 wherein one pattern of the potential fraud comprises a pattern of multiple dispense commands without corresponding cardholder authentication commands.

* * * * *